United States Patent
Kim et al.

(10) Patent No.: US 11,195,657 B2
(45) Date of Patent: Dec. 7, 2021

(54) MULTILAYER ELECTRONIC COMPONENT

(71) Applicant: SAMSUNG ELECTRO-MECHANICS CO., LTD., Suwon-si (KR)

(72) Inventors: Je Jung Kim, Suwon-si (KR); Seung Ryeol Lee, Suwon-si (KR); Ji Won Lee, Suwon-si (KR)

(73) Assignee: SAMSUNG ELECTRO-MECHANICS CO LTD, Suwon-si (KR)

(*) Notice: Subject to any disclaimer, the term of this patent is extended or adjusted under 35 U.S.C. 154(b) by 71 days.

(21) Appl. No.: 16/811,116

(22) Filed: Mar. 6, 2020

(65) Prior Publication Data

US 2021/0065977 A1 Mar. 4, 2021

(30) Foreign Application Priority Data

Aug. 28, 2019 (KR) .................. 10-2019-0105818

(51) Int. Cl.
*H01G 4/012* (2006.01)
*H01G 4/232* (2006.01)
*H01G 4/30* (2006.01)

(52) U.S. Cl.
CPC .......... *H01G 4/012* (2013.01); *H01G 4/2325* (2013.01); *H01G 4/30* (2013.01)

(58) Field of Classification Search
CPC ............ H01G 4/12; H01G 2/065; H01G 2/24; H01G 4/0085; H01G 4/012; H01G 4/20; H01G 4/2325; H01G 4/306; H01G 4/33; H01G 4/232; H01G 4/30
See application file for complete search history.

(56) References Cited

U.S. PATENT DOCUMENTS

2004/0262037 A1* 12/2004 Shizuno .............. H01L 41/0477
174/261
2006/0221544 A1* 10/2006 Lee .......................... H01G 4/30
361/303
2010/0079925 A1* 4/2010 Togashi ................. H01G 4/005
361/306.3

(Continued)

FOREIGN PATENT DOCUMENTS

| JP | 2013-093374 A | 5/2013 |
|---|---|---|
| KR | 10-2010-0036982 A | 4/2010 |
| KR | 10-2015-0125335 A | 11/2015 |

*Primary Examiner* — Michael P McFadden
(74) *Attorney, Agent, or Firm* — Morgan, Lewis & Bockius LLP

(57) ABSTRACT

A multilayer electronic component includes a body including a capacitance forming portion including dielectric layers and first and second internal electrodes with respective dielectric layers interposed therebetween and an upper cover portion and a lower cover portion, respectively disposed above and below the capacitance forming portion, and first and second external electrodes disposed on the body and respectively connected to the first and second internal electrodes. At least one of the upper cover portion or the lower cover portion includes a dummy electrode layer including a dummy pattern having a mesh shape. The dummy pattern includes a first dummy pattern, connected to the first external electrode, and a second dummy pattern spaced apart from the first dummy pattern and connected to the second external electrode.

17 Claims, 10 Drawing Sheets

(56) References Cited

U.S. PATENT DOCUMENTS

| | | | | |
|---|---|---|---|---|
| 2014/0233150 A1* | 8/2014 | Chung | .................... | H01G 4/12 |
| | | | | 361/301.4 |
| 2015/0016014 A1* | 1/2015 | Park | ...................... | H01G 2/065 |
| | | | | 361/301.4 |
| 2015/0255213 A1* | 9/2015 | Lee | ......................... | H05K 1/18 |
| | | | | 174/258 |
| 2015/0318110 A1 | 11/2015 | Lee et al. | | |
| 2018/0166215 A1* | 6/2018 | Hamanaka | ............. | H01G 4/232 |

* cited by examiner

MULTILAYER ELECTRONIC COMPONENT

CROSS-REFERENCE TO RELATED APPLICATION(S)

This application claims the benefit under 35 USC 119(a) of Korean Patent Application No. 10-2019-0105818 filed on Aug. 28, 2019 in the Korean Intellectual Property Office, the entire disclosure of which is incorporated herein by reference for all purposes.

TECHNICAL FIELD

The present disclosure relates to a multilayer electronic component.

BACKGROUND

A multilayer ceramic capacitor (MLCC), a type of multilayer electronic component, may be a chip type capacitor mounted on a printed circuit board of various electronic products such as imaging devices including liquid crystal displays (LCDs), plasma display panels (PDPs), and the like, and computers, smartphones, mobile phones, and the like, serving to charge or discharge electricity therein or therefrom.

Such multilayer ceramic capacitors may be used as components of various electronic devices due to their relatively small size, relatively high capacitance, and relative ease of mounting. As various electronic devices such as computers, mobile devices, or the like are miniaturized and increased in terms of output, demand for miniaturization and high capacitance of multilayer ceramic capacitors is increasing.

In addition, as recent interest in electric/electronic vehicle components has increased, multilayer ceramic capacitors have also come to require relatively high-reliability and high-strength characteristics to be used in vehicle or infotainment systems.

To secure high-reliability and high-strength characteristics, a method of adding a dummy electrode to cover portions, disposed above and below a capacitor capacitance forming portion, has been proposed.

However, since the guidelines for high-reliability and high-strength characteristics, required by the industry, are increasing, there is demand for a method for further improving high-reliability and high-strength characteristics.

SUMMARY

An aspect of the present disclosure is to provide a multilayer electronic component having improved bending strength characteristics.

An aspect of the present disclosure is to provide a multilayer electronic component in which a cracking propagation direction is controlled to suppress cracking propagation to a capacitance forming portion.

An aspect of the present disclosure is to provide a multilayer electronic component having improved reliability.

However, the objects of the present disclosure are not limited to the above description, and will be more easily understood in the process of describing specific embodiments of the present disclosure.

According to an aspect of the present disclosure, a multilayer electronic component includes a body including a capacitance forming portion including dielectric layers and first and second internal electrodes with respective dielectric layers interposed therebetween and an upper cover portion and a lower cover portion, respectively disposed above and below the capacitance forming portion, and first and second external electrodes disposed on the body and respectively connected to the first and second internal electrodes. At least one of the upper cover portion or the lower cover portion includes a dummy electrode layer including a dummy pattern having a mesh shape. The dummy pattern includes a first dummy pattern, connected to the first external electrode, and a second dummy pattern spaced apart from the first dummy pattern and connected to the second external electrode.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
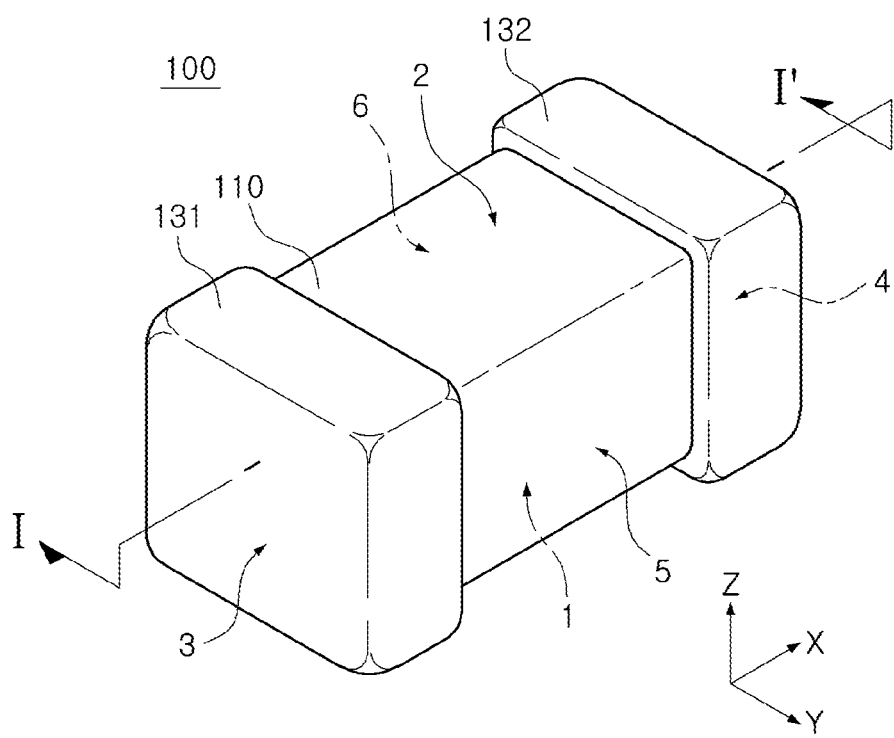
FIG. 1 is a schematic perspective view of a multilayer electronic component according to an embodiment of the present disclosure.

Hereinafter, embodiments of the present disclosure will be described with reference to specific embodiments and the accompanying drawings. However, embodiments of the present disclosure may be modified to have various other forms, and the scope of the present disclosure is not limited to the embodiments described below. Further, embodiments of the present disclosure may be provided for a more complete description of the present disclosure to the ordinarily skilled artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawing, an X direction may be defined as a second direction, an L direction, or a longitudinal direction, a Y direction may be defined as a third direction, a W direction, or a width direction, and a Z direction may be defined as a first direction, a stacking direction, a T direction, or a thickness direction.

Multilayer Electronic Component

FIG. 1 is a schematic perspective view of a multilayer electronic component according to an embodiment.

Figure 2:
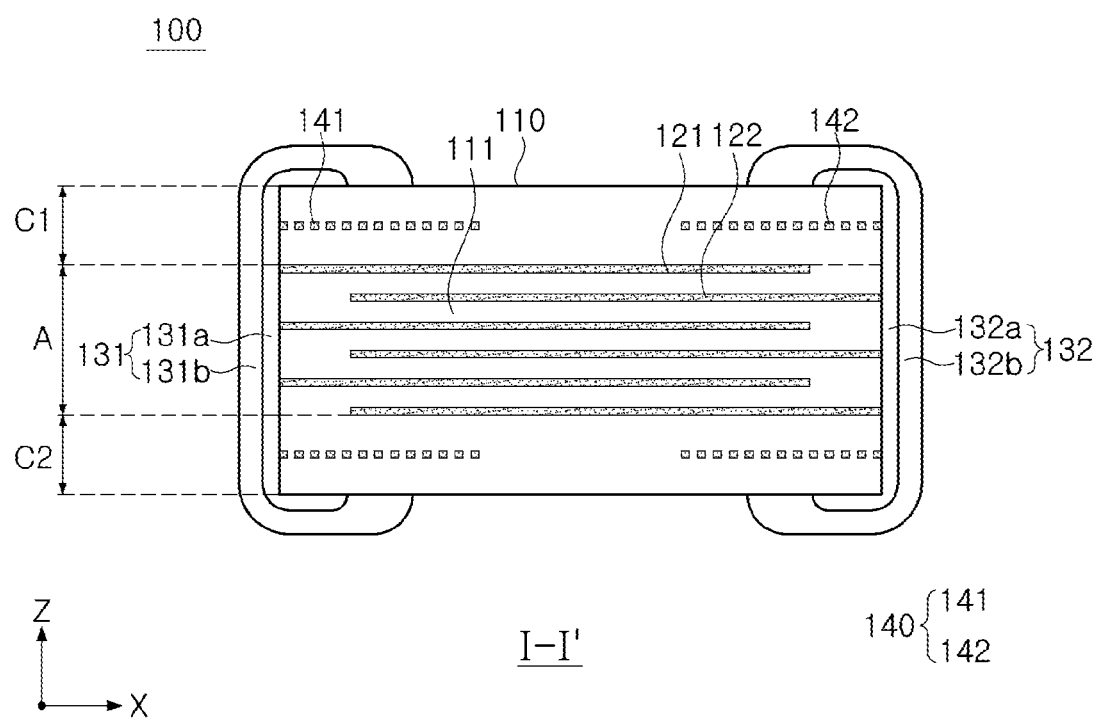
FIG. 2 is a cross-sectional view taken along line I-I' in FIG. 1.

FIG. 2 is a cross-sectional view taken along line I-I' in FIG. 1.

Figure 3:
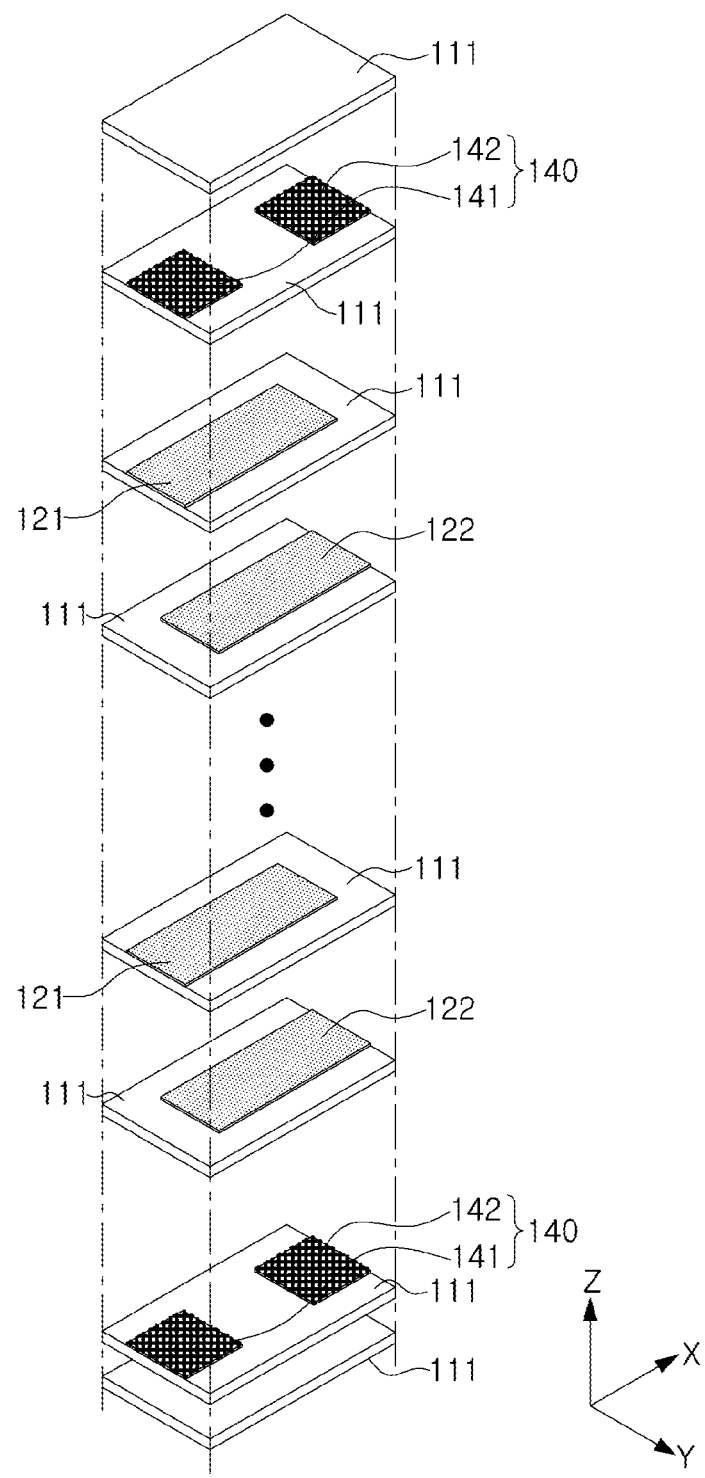
FIG. 3 is an exploded perspective view of a body according to an embodiment of the present disclosure.

FIG. 3 is an exploded perspective view of a body according to an embodiment.

Figure 4:
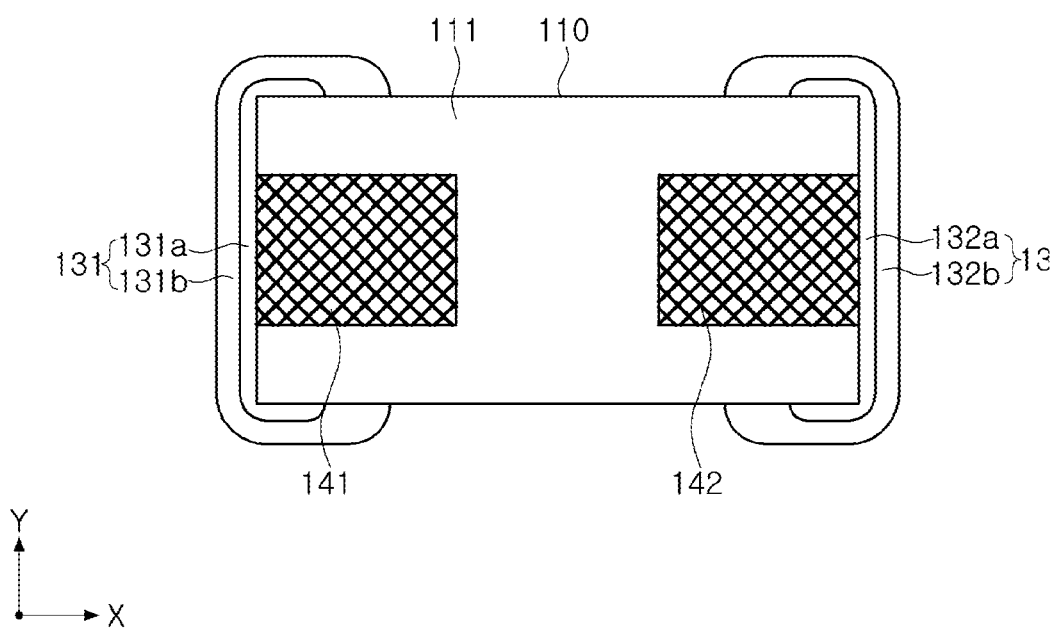
FIG. 4 is a cross-sectional view taken in a length-width direction (L-W), illustrating a dummy electrode layer according to an embodiment of the present disclosure.

FIG. 4 is a cross-sectional view taken in a length-width direction (L-W), illustrating a dummy electrode layer according to an embodiment.

Hereinafter, a multilayer electronic component according to an embodiment will be described with reference to FIGS. 1 to 4.

A multilayer electronic component 100 according to an embodiment includes a body 110 including a capacitance forming portion A including dielectric layers 111 and first and second internal electrodes 121 and 122 with respective dielectric layers 111 interposed therebetween and an upper cover portion C1 and a lower cover portion C2, respectively disposed above and below the capacitance forming portion A, and first and second external electrodes 131 and 132 disposed on the body 100 and respectively connected to the first and second internal electrodes 121 and 122. At least one of the upper cover portion C1 and the lower cover portion C2 includes a dummy electrode layer 140 including a dummy pattern having a mesh shape, and the dummy pattern includes a first dummy pattern 141, connected to the first external electrode 131, and a second dummy pattern 142 spaced apart from the first dummy pattern 141 and connected to the second external electrode 132.

In the body 110, the dielectric layers 111 and the internal electrodes 121 and 122 are alternately laminated.

The body 110 is not limited in shape, but may have a hexahedral shape or a shape similar thereto. Due to shrinkage of ceramic powder particles included in the body 110 during sintering, the body 110 may have a substantially hexahedral shape rather than a hexahedral shape having complete straight lines.

The body 110 may have the first and second surfaces 1 and 2 opposing each other in a thickness direction (the Z direction), the third and fourth surfaces 3 and 4 connected to the first and second surfaces 1 and 2 and opposing each other in a length direction (an X direction), and the fifth and sixth surfaces 5 and 6 connected to the first and second surfaces 1 and 2 and as well as to the third and fourth surfaces 3 and 4 and opposing each other in a width direction (a Y direction).

The plurality of dielectric layers 111, constituting the body 110, are in a sintered state and may be integrated with each other such that boundaries therebetween may not be readily apparent without using a scanning electron microscope (SEM).

According to an embodiment, a raw material forming the dielectric layer 111 is not limited as long as sufficient capacitance may be obtained. For example, a barium titanate-based material, a lead composite perovskite-based material, a strontium titanate-based material, or the like, may be used.

Various ceramic additives, organic solvents, plasticizers, binders, dispersants, or the like may be added to the powder of barium titanate ($BaTiO_3$), and the like, according to the purpose of the present disclosure, as the material for forming the dielectric layer 111.

The body 110 includes a capacitance forming portion A including a first internal electrode 121 and a second internal electrode 122, disposed inside the body 110 and alternately laminated with respective dielectric layer 111 interposed therebetween, and an upper cover portion C1 and a lower cover portion C2, respectively disposed above and below the capacitance forming portion A.

The capacitance forming portion A is a portion contributing to forming capacitance of a capacitor, and is formed by repeatedly laminating a plurality of first and second internal electrodes 121 and 122 with respective dielectric layers 111 interposed therebetween.

The upper cover portion C1 and the lower cover portion C2 may be formed by vertically laminating dielectric layers 111 on an upper surface and a lower surface of the capacitance forming portion A, respectively. The upper cover portion C1 and the lower cover portion C2 may basically serve to prevent damage to an internal electrode caused by physical or chemical stress.

At least one of the upper cover portion C1 or the lower cover portion C2 includes a dummy electrode layer 140 including dummy pattern 141 and 142 each having a mesh shape.

A method of locating a dummy electrode on the upper cover portion C1 and the lower cover portion C2 has been proposed to improve bending strength characteristics. However, it may be difficult to completely suppress bending cracking and short-circuit and insulation degradation may occur when a bending crack occurs.

According to the present disclosure, each of the dummy patterns 141 and 142, included in the dummy electrode layer 140, has a mesh shape. Therefore, even when bending cracking occurs, the cracking may propagate along the dummy pattern to be prevented from propagating to the capacitance forming portion A.

As a result, even when bending cracking occurs, the occurrence of short-circuit and insulation degradation may be suppressed.

The dummy patterns 141 and 142 include a first dummy pattern 141, connected to the first external electrode 131, and a second dummy pattern 142 spaced apart from the first dummy pattern 141 and connected to the second external electrode 132.

As illustrated in FIG. 2, the first dummy pattern 141 and the second dummy pattern 142 constitute a single dummy electrode layer 140. The first dummy pattern 141 is exposed to the third surface 3 of the body 110 to be connected to the first external electrode 131, and the second dummy pattern 142 is exposed to the fourth surface 4 of the body 110 to be connected to the second external electrode 132.

The dummy patterns 141 and 142 may basically serve to improve the bending strength characteristics.

In addition, the dummy patterns 141 and 142 may play a guiding role when cracking occurs, such that the cracking propagates along the first dummy pattern 141 or the second dummy pattern 142 to propagate outwardly of the body 110 rater than to the capacitance forming portion A.

Each of the dummy patterns 141 and 142 has a mesh shape including a plurality of conductor lines.

Since the dummy patterns 141 and 142 include a plurality of regularly repeated conductor lines, the dummy patterns 141 and 142 may have a plurality of through-holes and the plurality of through holes may be regularly repeated. In one example, each of the dummy patterns 141 and 142 may include first conductor lines extending parallel to or substantially parallel to each other and having the same or substantially the same interval therebetween, and second conductor lines extending parallel to or substantially parallel to each other and having the same or substantially the same interval therebetween. One or more of the first conductor lines may intersect one or more of the second conductor lines. The term, "substantially," reflects consideration of recognizable process errors which may occur during manufacturing.

Referring to FIG. 4, dummy patterns 141 and 142 may include a plurality of regularly repeated conductor lines to have a plurality of through-holes, each having a diamond shape. Accordingly, even when bending cracking occurs, the cracking may propagate along the dummy pattern. In addition, concentration of stress may be suppressed, and the stress may be dispersed.

In FIG. 4, the through-hole is illustrated as having a diamond shape. However, a shape of the through-hole is not limited thereto. Each of the through-holes may have a hexagonal shape, a rectangular shape, a triangular shape, a circular shape, a polygonal shape, or the like.

Figure 5:
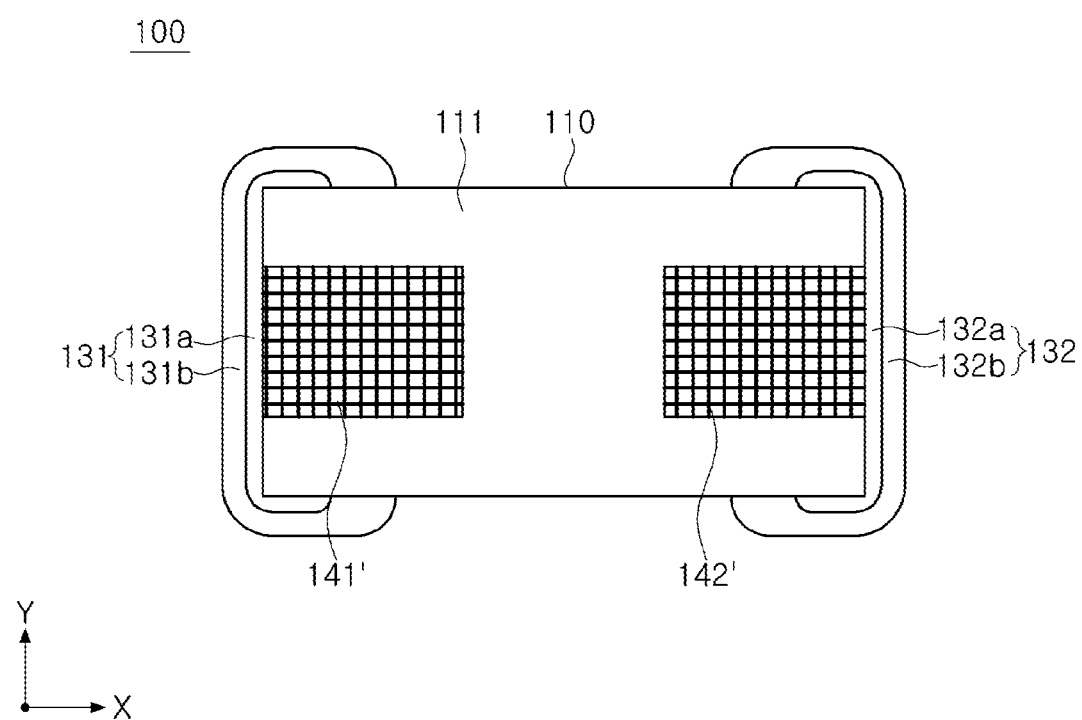
FIG. 5 is a cross-sectional view taken in the length-width direction (L-W), illustrating a dummy electrode layer according to a first modified embodiment.

Referring to FIG. 5, a cross-sectional view taken in the length-width direction (L-W), illustrating a dummy electrode layer according to a first modified embodiment, dummy patterns 141' and 142' may include a plurality of regularly repeated conductor lines to have a plurality of through-holes, each having a square shape. In one example, each of the dummy patterns 141' and 142' may include first conductor lines extending parallel to or substantially parallel to each other and having the same or substantially the same interval therebetween, and second conductor lines extending parallel to or substantially parallel to each other and having the same or substantially the same interval therebetween.

Figure 6:
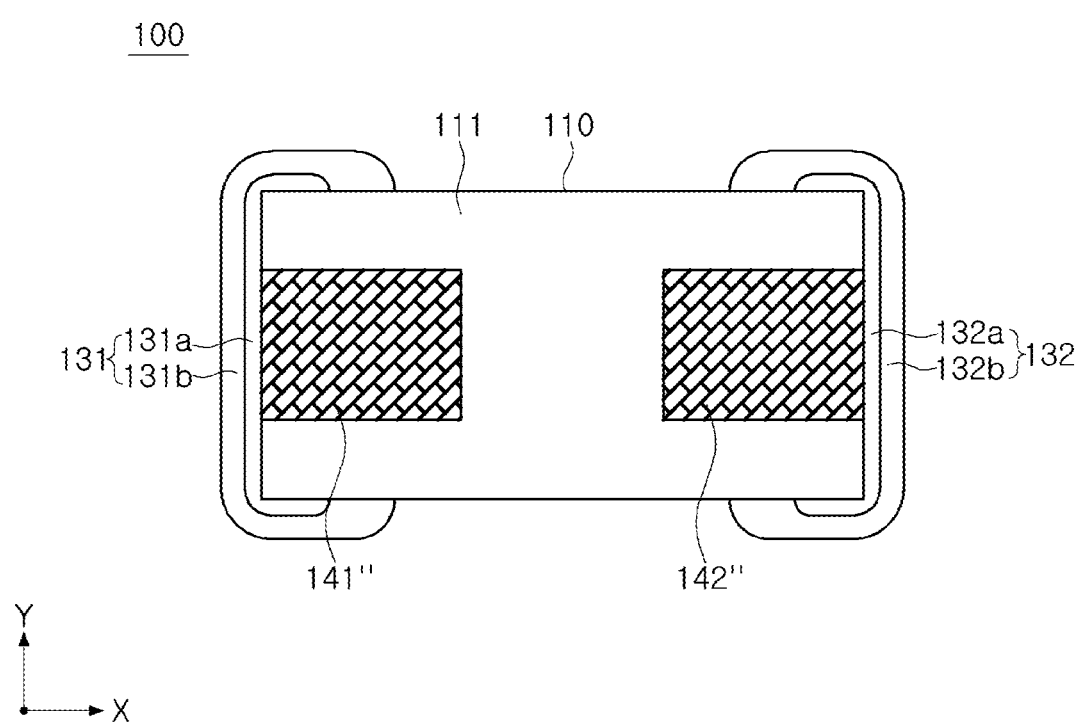
FIG. 6 is a cross-sectional view taken in the length-width direction (L-W), illustrating a dummy electrode layer according to a second modified embodiment.

Referring to FIG. 6, a cross-sectional view taken in the length-width direction (L-W), illustrating a dummy electrode layer according to a second modified embodiment, dummy patterns 141" and 142" may include a plurality of regularly repeated conductor lines to have a plurality of through-holes, each having a rectangular shape. In one example, each of the dummy patterns 141" and 142" may include first conductor lines extending parallel to or substantially parallel to each other and having the same or substantially the same interval therebetween, and second conductor lines extending parallel to or substantially parallel to each other and having the same or substantially the same interval therebetween.

Figure 7:
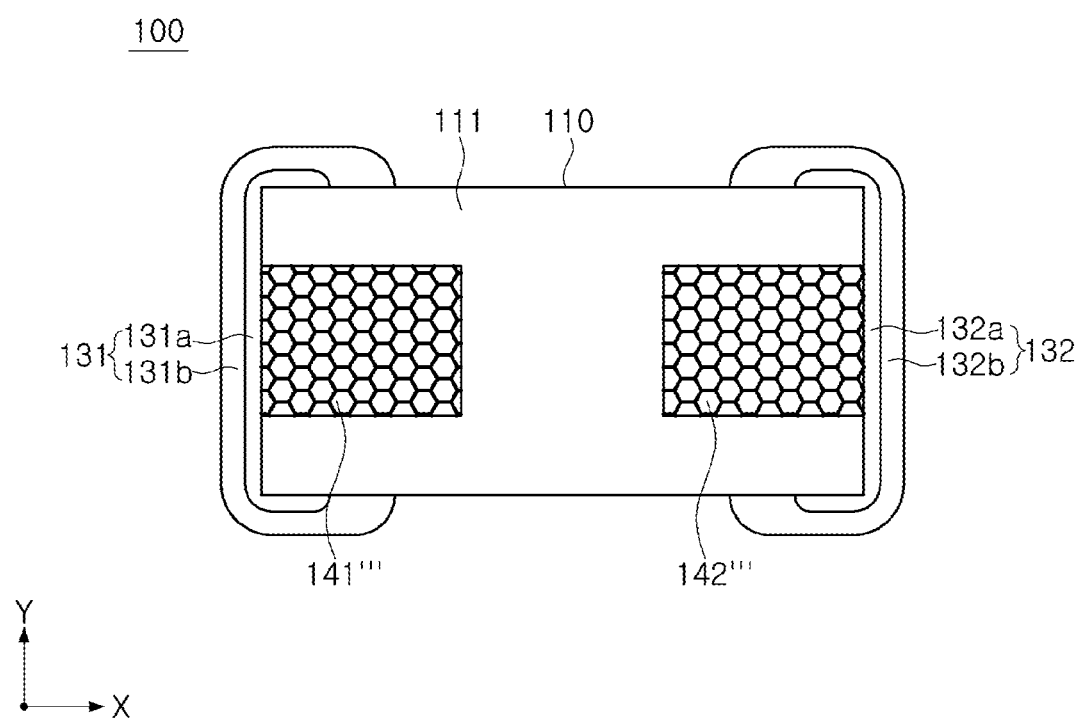
FIG. 7 is a cross-sectional view taken in the length-width direction (L-W), illustrating a dummy electrode layer according to a third modified embodiment.

Referring to FIG. 7, a cross-sectional view taken in the length-width direction (L-W) illustrating a dummy electrode layer according to a third modified embodiment, dummy patterns 141''' and 142''' may include a plurality of regularly repeated conductor lines to have a plurality of through-holes, each having a hexagon shape.

In FIGS. 4 to 7, the first dummy pattern and the second dummy pattern are illustrated as having the same mesh shape. However, mesh shapes of the first and second dummy patterns are not limited thereto and may be different from each other.

The dummy patterns 141 and 142 may include a conductive metal.

A conductive metal forming the dummy patterns 141 and 142 is not limited. For example, the dummy patterns 141 and 142 may be formed using a conductive paste including at least one of a noble metal material such as palladium (Pd), a palladium-silver (Pd—Ag) alloy, or the like, nickel (Ni), and copper (Cu).

A method of printing the conductive paste may be a screen-printing method, a gravure printing method, or the like, but is not limited thereto.

At least one of the upper cover portion C1 and the lower cover portion C2 may include a plurality of dummy electrode layers 140. Accordingly, the effect of suppressing bending cracking propagation to the capacitance forming portion A may be further improved.

Figure 8:
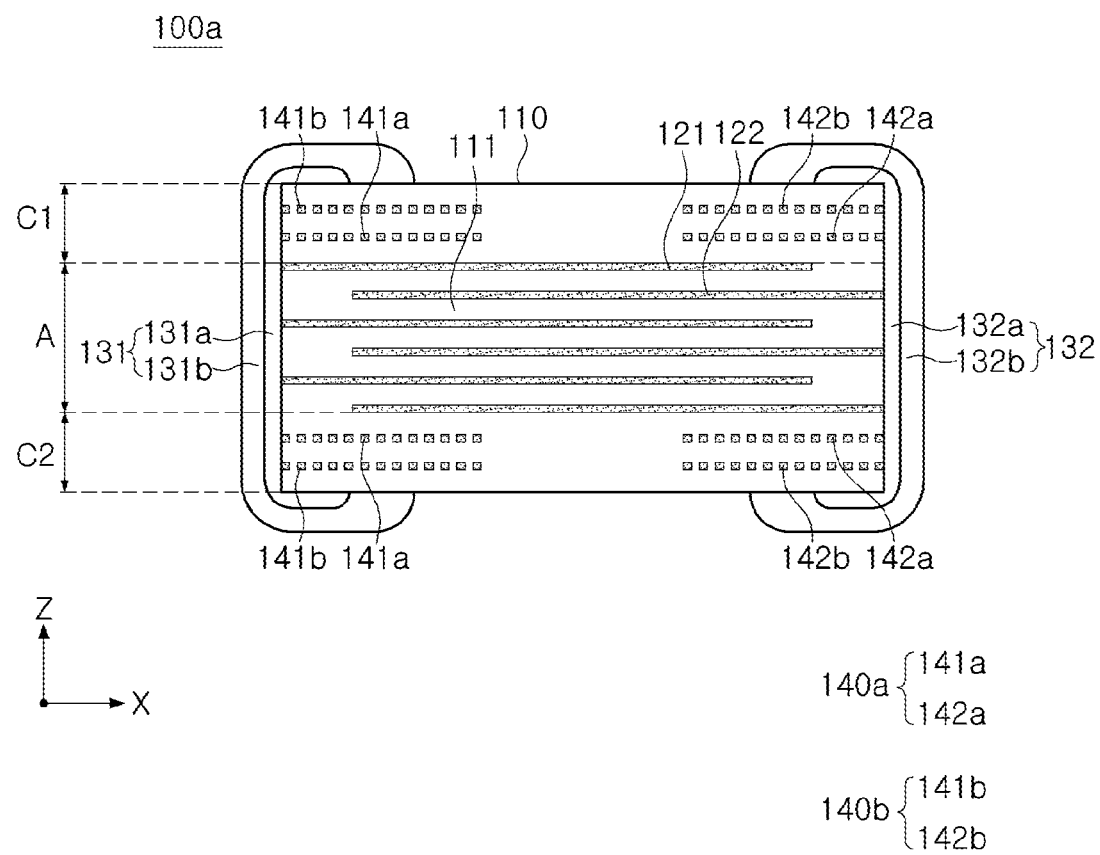
FIG. 8 is a cross-sectional view in length and thickness directions (L-T), illustrating a multilayer electronic component according to a fourth modified embodiment.

Referring to FIG. 8, a cross-sectional view in length and thickness directions (L-T), illustrating a multilayer electronic component according to a fourth modified embodiment, an upper cover portion C1 and a lower cover portion C2 may include a plurality of dummy electrode layers including a first dummy electrode layer 140a and a second dummy electrode layer 140b.

Figure 9:
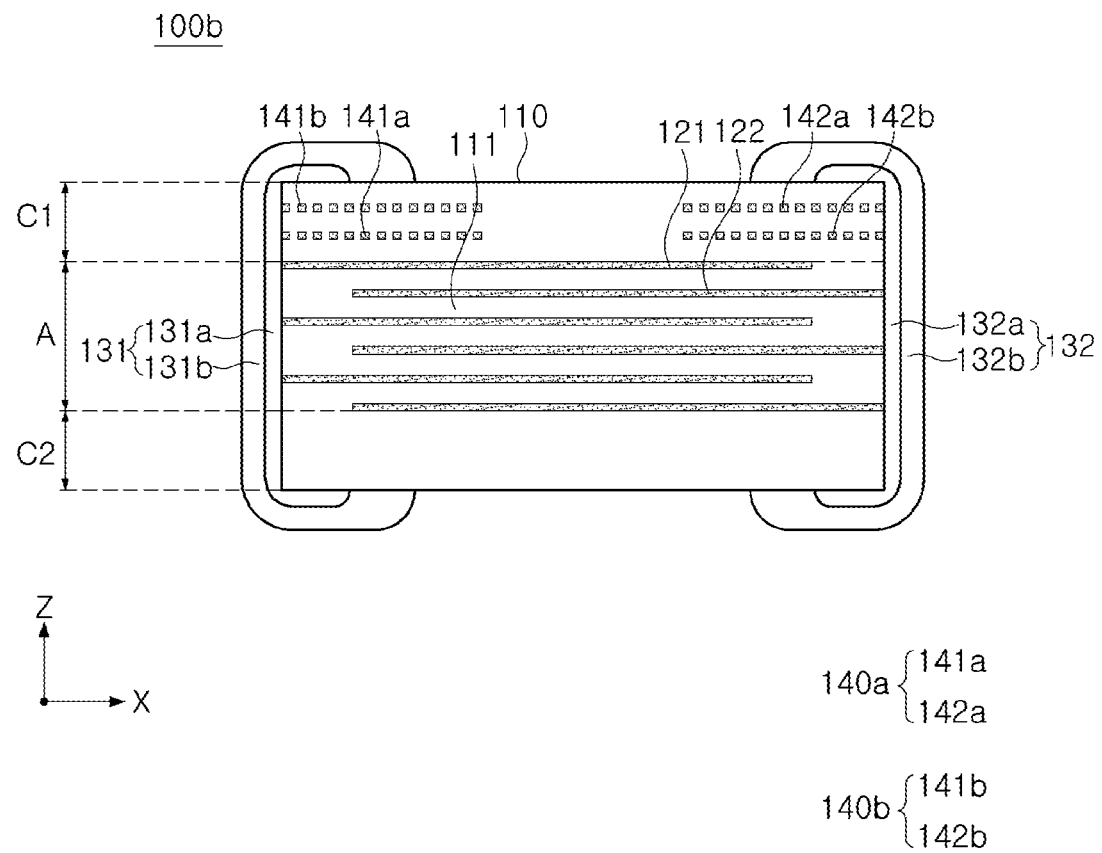
FIG. 9 is a cross-sectional view in length and thickness directions (L-T), illustrating a multilayer electronic component according to a fifth modified embodiment.

Referring to FIG. 9, a cross-sectional view in length and thickness directions (L-T), illustrating a multilayer electronic component according to a fifth modified embodiment, a lower cover portion C2 may not include a dummy electrode layer while an upper cover portion C1 may include a plurality of dummy electrode layers including a first dummy electrode layer 140a and a second dummy electrode layer 140b.

In this case, at least one of the plurality of dummy electrode layers may include a dummy pattern having a mesh shape different from a mesh shape of another dummy electrode layer. Thus, a stress dispersion direction may be changed to further improve a stress dispersion effect.

Figure 10:
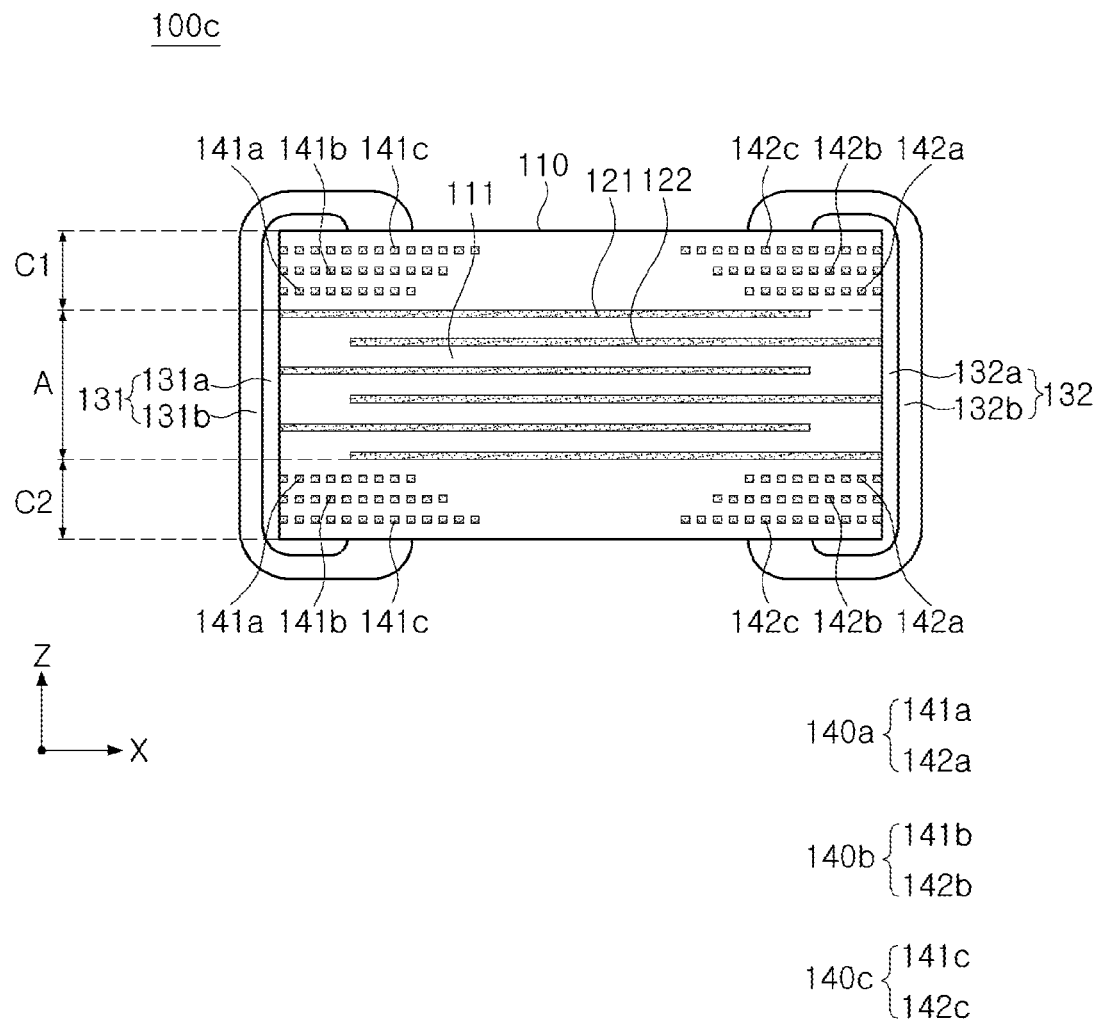
FIG. 10 is a cross-sectional view in length and thickness directions (L-T), illustrating a multilayer electronic component according to a sixth modified embodiment.

Referring to FIG. 10, a cross-sectional view in length and thickness directions (L-T), illustrating a multilayer electronic component according to a sixth modified embodiment, at least one of a plurality of dummy electrode layers 140a, 140b, and 140c may include a dummy pattern having a length different from a length of a dummy pattern of another dummy electrode layer.

As illustrated in FIG. 10, among the plurality of dummy electrode layers 140a, 140b, and 140c, a first dummy electrode layer 140a, close to the capacitance forming portion A, may include dummy patterns 141a and 142a, each having a length shorter than a length of each of dummy patterns 141b, 142b, 141c, and 142c of second and third dummy electrode layers 140b and 140c distant from the capacitance forming portion A. Since the second dummy electrode layer 140b is disposed to be closer to the capacitance forming portion A than the third dummy electrode layer 140c, each of the dummy patterns 141b and 142b of the second dummy electrode layer 140b has a length shorter than a length of each of the dummy patterns 141c and 142c of the third dummy electrode layer 140c.

On the contrary to FIG. 10, among the plurality of dummy electrodes, a dummy electrode layer close to the capacitor forming portion A may have a length greater than a length of a dummy electrode layer distant from the capacitor forming portion A.

As the number of laminated layers of the internal electrodes 121 and 122 and the dielectric layer 111 is increased in the capacitance forming unit A, a step may be formed by the internal electrodes 121 and 122 to bend an end portion of the body 110 in a length direction (an X direction). However, when among the plurality of dummy electrode layers, a dummy electrode layer close to the capacitor forming portion A may have a length greater or less than a length of a dummy electrode layer distant from the capacitor forming portion A, a step formed by the internal electrodes 121 and 122 may be supplemented.

The plurality of internal electrodes 121 and 122 may be disposed to oppose each other with the dielectric layer 111 interposed therebetween.

The internal electrodes 121 and 122 may include first and second internal electrodes 121 and 122 alternately disposed to oppose each other with respective dielectric layers interposed therebetween.

The first and second internal electrodes 121 and 122 may be exposed to the third and fourth surfaces 3 and 4 of the body 110, respectively.

Referring to FIG. 2, the first internal electrode 121 may be spaced apart from the fourth surface 4 of the body 110 and may be exposed through the third surface 3 of the body 110, and the second internal electrode 122 may be spaced apart from the third surface 3 of the body 110 and may be exposed through the fourth surface 4 of the body 110. The first external electrode 131 may be disposed on the third surface 3 of the body 110 to be connected to the first internal electrode 121, and the second external electrode 132 may be disposed on the fourth surface 4 of the body 110 to be connected to the second internal electrode 122.

The first and second internal electrodes 121 and 122 may be electrically isolated from each other by the dielectric layer 111 disposed therebetween.

A material forming the first and second internal electrodes 121 and 122 is not limited. For example, the first and second internal electrodes 121 and 122 may be formed using a conductive paste containing a noble metal material such as palladium (Pd), a palladium-silver (Pd—Ag) alloy, or the like, nickel (Ni), and copper (Cu).

A method of printing the conductive paste may be a screen-printing method, a gravure printing method, or the like, but is not limited thereto.

Referring to FIG. 3, the body 110 may be formed by alternately locating a dielectric layer 111, on which the first internal electrode 121 is printed, and a dielectric layer 111, on which the second internal electrode 122 is printed, on the dummy electrode layer 140 on which the dummy patterns 141 and 142 are printed, laminating a dummy electrode layer 140, on which dummy patterns 141 and 142 are printed, on the dielectric layers 111, and sintering the dummy electrode layer 140.

The external electrodes 131 and 132 are disposed on the body 110 and connected to the internal electrodes 121 and 122. As illustrated in FIG. 2, the external electrodes 131 and 132 may include first and second external electrodes 131 and 132 connected to the first and second internal electrodes 121 and 122, respectively.

The first and second external electrodes 131 and 132 may be electrically connected to the first and second internal electrodes 121 and 122, respectively, to form capacitance, and the second external electrode 132 may be connected to a potential different from a potential to which the first external electrode 131 is connected.

The first external electrode 131 may include a first electrode layer 131a, connected to the first internal electrode 121, and a first conductive resin layer 131b disposed on the first electrode layer 131a.

The first electrode layer 131a may be disposed on the third surface to be connected to the first internal electrode 121 and may extend to a portion of the first, second, fifth, and sixth surfaces. The first conductive resin layer 131b may be disposed to cover the first electrode layer 131a.

The second external electrode 132 may include a second electrode layer 132a, connected to the second internal electrode 122, and a second conductive resin layer 132b disposed on the second electrode layer 132a.

The second electrode layer 132a may be disposed on the fourth surface to be connected to the second internal electrode 122 and may extend to a portion of the first, second, fifth and sixth surfaces. The second conductive resin layer 132b may be disposed to cover the second electrode layer 132a.

In the external electrodes 131 and 132, a region disposed on the third and fourth surfaces may be defined as a connection portion, and a region disposed on the first, second, fifth, and sixth surfaces may be defined as a band portion.

For example, the first external electrode 131 may include a connection portion, disposed on the third surface of the body 110, and a band portion extending from the connection portion to a portion of the first, second, fifth and sixth surfaces of the body. Similarly, the second external electrode 132 may include a connection portion, disposed on the fourth surface of the body 110, and a band portion extending from the connection portion to a portion of the first, second, fifth and sixth surfaces of the body 110.

The electrode layers 131a and 132a may include a conductive metal and glass.

A conductive metal, used for the electrode layers 131a and 132a, is not limited as long as it may be electrically connected to the internal electrode to form capacitance and may include at least one selected from the group consisting of, for example, copper (Cu), silver (Ag), nickel (Ni), or alloys thereof.

The electrode layers 131a and 132a may be formed by applying a conductive paste, prepared by adding a glass frit, to the conductive metal powder particles and sintering the conductive paste.

The conductive resin layers 131b and 132b may include a conductive metal and a base resin.

The conductive metal, included in the conductive resin layers 131b and 132b, serves to electrically connect the conductive resin layers 131b and 132b to the electrode layers 131a and 132a.

The conductive metal, included in the conductive resin layers 131b and 132b, is not limited as long as it may be electrically connected to the electrode layers 131a and 132a and may include at least one selected from the group consisting of, for example, copper (Cu), silver (Ag), nickel (Ni), and alloys thereof.

The conductive metal, included in the conductive resin layers 131b and 132b, may include at least one of spherical powder particles or flake powder particles. For example, the conductive metal may include only flake powder particles, or only spherical powder particles, or a mixture of flake powder particles and spherical powder particles.

The spherical powder particles may have an incompletely spherical shape and may have, for example, a shape in which a ratio of a length of a major axis to a length of a minor axis (the major axis/the minor axis) is 1.45 or less. According to one embodiment of the present disclosure, a length of a major axis may refer to the largest dimension across a center of a particle, and a length of a minor axis may refer to the smallest dimension across the center of the particle.

The flake powder particles refer to powder particles, each having a flat and elongated shape, and is not limited to a specific shape and, for example, a ratio of a length of a major axis and a length of a minor axis (the major axis/the minor axis) may be 1.95 or more.

The lengths of the major axes and the minor axes of the spherical powder particles and the flake powder particles may be measured from an image obtained by scanning a cross section (an L-T cross section), taken from a central portion of a multilayer electronic component in a width (Y) direction, in X and Z directions with a scanning electron microscope (SEM).

The base resin, included in the conductive resin layers 131b and 132b, serves to secure adhesion and to absorb impact.

The base resin, included in the conductive resin layers 131b and 132b, is not limited as long as it has adhesion and impact absorption and is mixed with conductive metal powder particles to prepare a paste and may include, for example, an epoxy-based resin.

In addition, the conductive resin layers 131b and 132b may include a conductive metal, an intermetallic compound, and a base resin.

The external electrodes 131 and 132 may further include plating layers disposed on the conductive resin layers 131b and 132b to improve mounting characteristics.

For example, the plating layer may be a nickel (Ni) plating layer or a tin (Sn) plating layer, may have a structure in which the Ni plating layer and the Sn plating layer may be sequentially formed on the conductive resin layers 131b and 132b, and may include a plurality of Ni plating layers and/or a plurality Sn plating layer.

Experiment

To confirm an effect obtained by forming a dummy pattern having a mesh shape, a sample chip (Invention Example) as illustrated in FIGS. 1 to 4 and a sample chip (Comparative Example), having the same configuration as Inventive Example but having a common shape (e.g., a plate shape) different from the mesh shape, were manufactured.

After preparing 60 sample chips for each of Invention Example and Comparative Example, capacitance method bending strength evaluation was performed on the sample chips and a result of the evaluation is shown in Table 1.

In the capacitive method bending strength evaluation, sample chips were mounted on a printed circuit board (PCB). When a surface opposing a surface, on which the samples are mounted, was pressed 4 mm, 5 mm, 6 mm, and 7 mm, respective capacitances thereof were measured. Samples, reduced by 5% or more in capacitance as compared with capacitance before pressing the surface, were evaluated as poor-capacitance samples. The number of the poor-capacitance samples is shown in Table 1.

TABLE 1

| Classification | Capacitance Method Bending Strength Evaluation | | | |
| --- | --- | --- | --- | --- |
|  | 4 mm | 5 mm | 6 mm | 7 mm |
| Comparative Example | 0/60 | 0/60 | 2/60 | 5/60 |
| Inventive Example | 0/60 | 0/60 | 0/60 | 0/60 |

As can be seen from Table 1, in the case of Comparative Example to which a dummy pattern having a common shape is applied, poor capacitance occurred in two sample chips when pressed 6 mm, and poor capacitance occurred in five sample chips when pressed 7 mm.

On the other hand, in the case of Inventive Example to which a dummy pattern having a mesh shape is applied, there was no poor-capacitance chip among the 60 sample chips when pressed to 7 mm.

Accordingly, when a dummy pattern having a mesh shape is applied, cracking propagates along the dummy pattern. Therefore, even when cracking occurs, the cracking does not propagate to a capacitance forming portion.

As described above, a dummy electrode layer, including a dummy pattern having a mesh shape, may be disposed on a cover portion to suppress cracking propagation to a capacitance forming portion.

While embodiments have been shown and described above, it will be apparent to those skilled in the art that modifications and variations could be made without departing from the scope of the present disclosure as defined by the appended claims.

What is claimed is:

1. A multilayer electronic component comprising:
a body including a capacitance forming portion including dielectric layers and first and second internal electrodes with respective dielectric layers interposed therebetween and an upper cover portion and a lower cover portion, respectively disposed above and below the capacitance forming portion; and
first and second external electrodes disposed on the body and respectively connected to the first and second internal electrodes,
wherein at least one of the upper cover portion or the lower cover portion includes a dummy electrode layer including a dummy pattern having a mesh shape,
wherein the dummy pattern includes first conductor lines and second conductor lines, and
wherein one or more of the first conductor lines and one or more of the second conductor lines intersect each other and a length direction of the body.

2. The multilayer electronic component of claim 1, wherein the dummy pattern includes a first dummy pattern, connected to the first external electrode, and a second dummy pattern spaced apart from the first dummy pattern and connected to the second external electrode.

3. The multilayer electronic component of claim 2, wherein the first dummy pattern and the second dummy pattern have different mesh shapes to each other.

4. The multilayer electronic component of claim 1, wherein the dummy pattern has a plurality of through-holes, and the plurality of through-holes are regularly repeated.

5. The multilayer electronic component of claim 4, wherein each of the through-holes has any one of a hexagonal shape, a rectangular shape, a triangular shape, a circular shape, and a polygonal shape.

6. The multilayer electronic component of claim 1, wherein the dummy pattern includes a conductive metal.

7. The multilayer electronic component of claim 1, wherein at least one of the upper cover portion or the lower cover portion includes a plurality of dummy electrode layers.

8. The multilayer electronic component of claim 7, wherein at least one of the plurality of dummy electrode layers includes a dummy pattern having a mesh shape different from a mesh shape of a dummy pattern of another dummy electrode layer.

9. The multilayer electronic component of claim 7, wherein at least one of the plurality of dummy electrode layers include a dummy pattern having a length different from a length of a dummy pattern of another dummy electrode layer.

10. The multilayer electronic component of claim 7, wherein among the plurality of dummy electrode layers, a dummy electrode layer close to the capacitance forming portion includes a dummy pattern having a length less than a length of a dummy pattern of a dummy electrode layer distant from the capacitance forming portion.

11. The multilayer electronic component of claim 7, wherein among the plurality of dummy electrode layers, a dummy electrode layer close to the capacitance forming portion includes a dummy pattern having a length greater than a length of a dummy pattern of a dummy electrode layer distant from the capacitance forming portion.

12. The multilayer electronic component of claim 1, wherein the first external electrode includes a first electrode layer, connected to the first internal electrode, and a first conductive resin layer disposed on the first electrode layer,
the second external electrode includes a second electrode layer, connected to the second internal electrode, and a second conductive resin layer disposed on the second electrode layer, and
the first and second conductive resin layers include a conductive metal and a base resin.

13. The multilayer electronic component of claim 12, wherein the first and second electrode layers includes a conductive metal and glass.

14. The multilayer electronic component of claim 12, further comprising:
plating layers, respectively disposed on the first and second conductive resin layers.

15. The multilayer electronic component of claim 1, wherein the first conductor lines extend parallel to or substantially parallel to each other and have the same or substantially the same interval therebetween, and the second conductor lines extend parallel to or substantially parallel to each other and have the same or substantially the same interval therebetween.

16. A multilayer electronic component comprising:
a body including a capacitance forming portion including dielectric layers and first and second internal electrodes with respective dielectric layers interposed therebetween and an upper cover portion and a lower cover portion, respectively disposed above and below the capacitance forming portion; and
first and second external electrodes disposed on the body and respectively connected to the first and second internal electrodes,
wherein at least one of the upper cover portion or the lower cover portion includes a dummy electrode layer including a dummy pattern having a mesh shape,
wherein the dummy pattern includes a first dummy pattern, connected to the first external electrode, and a second dummy pattern spaced apart from the first dummy pattern and connected to the second external electrode, and
wherein the first dummy pattern and the second dummy pattern have different mesh shapes to each other.

17. A multilayer electronic component comprising:
a body including a capacitance forming portion including dielectric layers and first and second internal electrodes with respective dielectric layers interposed therebetween and an upper cover portion and a lower cover portion, respectively disposed above and below the capacitance forming portion; and
first and second external electrodes disposed on the body and respectively connected to the first and second internal electrodes,
wherein at least one of the upper cover portion or the lower cover portion includes a dummy electrode layer including a dummy pattern having a mesh shape,
wherein at least one of the upper cover portion or the lower cover portion includes a plurality of dummy electrode layers, and
wherein at least one of the plurality of dummy electrode layers includes a dummy pattern having a mesh shape different from a mesh shape of a dummy pattern of another dummy electrode layer.

\* \* \* \* \*